United States Patent [19]

Turner

[11] Patent Number: 4,537,483

[45] Date of Patent: Aug. 27, 1985

[54] OPTICAL PROJECTION VIEWING SYSTEM

[76] Inventor: Roger S. Turner, 620 Carpenter La., Philadelphia, Pa. 19119

[21] Appl. No.: 612,646

[22] Filed: May 21, 1984

[51] Int. Cl.³ .............................................. G02B 21/36
[52] U.S. Cl. ...................................... 353/39; 353/79; 353/119
[58] Field of Search ...................... 353/39, 79, 119, 77, 353/78, 98, 99, 100; 350/508

[56] References Cited

U.S. PATENT DOCUMENTS 2,170,967  8/1939  Epdenstein et al. ................... 353/39

FOREIGN PATENT DOCUMENTS 908054  8/1945  France ................................... 353/39

Primary Examiner—Harry N. Haroian
Attorney, Agent, or Firm—J. B. Sowell

[57] ABSTRACT

An improved optical projection viewing system is provided with a novel wide projection angle relay projection lens and a novel magnifying biocular viewing lens. The magnifying biocular viewing lens has non-symmetric front and rear biconvex surfaces having a uniform field distance when viewing the entire image on the viewing screen. The biocular viewing lens has positive distortion and color separation which is compensated for by negative distortion and color separation provided in the relay projection lens.

19 Claims, 5 Drawing Figures

OPTICAL PROJECTION VIEWING SYSTEM

BACKGROUND OF THE INVENTION

1. Field of the Invention

This invention relates to a novel improved optical projection viewing system. More particularly, the present invention relates to newly designed optical components which provide a wide field of view and a magnified image with a line resolution quality as good as the resolving power of the human eye.

2. Description of the Prior Art

The visual resolving power of the human eye is generally defined as being able to resolve five line pairs per millimeter at a distance of ten inches from the human eye. It is known that the resolving power of the human eye can be enhanced by interposing a magnifying optical system between the human eye and the object to be viewed.

Microscopes are employed to magnify objects at magnification powers in excess of about fifteen times to provide an enlarged image as sharp as the line resolution ability of the human eye. Modern high quality optical microscopes are capable of magnification powers of between one and two thousand times, however, at a magnification power around three hundred times the detail of the object being viewed has approached the wavelength of light. When this limit of diffraction defined by the wavelength of visibile light has been reached the additional magnification of the object being viewed is generally magnified but the detail of the object can no longer be increased due to the limit of diffraction.

Heretofore microscope optical projection viewing systems have projected a high resolution image onto a screen. My copending U.S. Pat. No. 4,449,799 filed Dec. 8, 1982 is entitled Optical Projection Viewing System and teaches the state of the art arrangement of optical components in a preferred embodiment microscope optical projection viewing system. The angle of projection of the image from the relay lens to the screen in this prior art system is achieved with the projection lenses having normal projection angles. In order to achieve high magnification of the image being projected on to the viewing screen it was necessary to project an enlarged image having a large portion projected beyond the edges of the viewing screen. If relay projection lenses of smaller projection angles had been employed to project the full image on the screen, the manification of the object being viewed would have appeared smaller. If the normal relay projection lens is retained, but the screen is brought closer to the relay projection lens, then the size of the projected image on the screen is made smaller. Even though the image is brought close to the eyes of the viewer, the overall magnification is smaller. Bringing the image closer to the eyes of the viewer decreases the field distance, which causes other problems. If the screen had been enlarged without changing the projection angle or bringing the screen closer to the relay projection lens, then the outer edges of the image would have a great amount of distortion which would be observed on the viewing screen. Enlarging the screen which is being viewed through a biocular magnifying viewing lens generates larger amounts of off-axis viewing of the field of view which also causes other problems.

If any of the aforementioned alternatives are accepted which reduce the magnification of the image on the screen, then the biocular viewing lens should be designed to make up for the lost magnification. It was found that attempts to increase the magnification of the biocular lens to increase the magnification of the image on the screen beyond a small amount created color separation and counter productive aberrations within the range of detection capability of the human eye.

When the relay lens was designed to have a smaller angle of projection to entirely project the total image onto the viewing screen, then the magnification of the object being viewed was reduced and any increase in magnification in the biocular lens to make up for this lost magnification created the same aforementioned color separation and aberrations.

It is desirable that the biocular viewing lens in a microscope optical projection viewing system have magnification, however, the eye focal distance or field distance to the object being viewed through the biocular viewing lens cannot be made so short as to induce eye strain over a period of use.

When a symmetrical biconvex biocular viewing lens was employed in an optical projection viewing system, the amount of magnification of the biocular lens could be increased by decreasing the radius of curvature of the lens surfaces, however this induced more color separation and noticeable aberrations. The color separation was the major limitation of the resolving power of such a lens. Color separation causes a black line to appear to have a blue band on one side of the line and a red band on the other side of the black line creating a fuzzy or poorly defined line.

When a symmetrical biconvex biocular viewing lens was maintained at a fixed distance from the eye of the viewer and the viewing screen is placed closer to the lens, the screen was magnified more; however, the field distance was shortened, which induced eyestrain. Moreover, the edges of the screen then appeared to be more subject to color separation and aberrations due to the increase in the off axis of field view through the viewing lens that was required to view the edges of the screen. Heretofore, ergonomic considerations in microscope optical projection viewing systems were substantially ignored in order to achieve magnification powers at the expense of field size which is not comparable with well designed high power wide field microscopes. When the magnification of the biocular viewing lens was increased, the field distance oserved by one eye was different from the field distance observed by the other eye. It has been found that both eyes attempted to shift their focus to the same field distance when viewing through a biocular viewing lens and the lenses of the eyes vacillated between the two different field distances creating a swimming sensation or vertigo. The cause of th swimming sensation or vertigo was not specifically recognized heretofore. If the eye focus shift is not severe, it only results in operator fatigue which has not been identified as being caused by eye focus shift heretofore.

If any of the optical elements of the microscope optical projection viewing system are designed for enhanced magnification and field size which induces color separation and aberrations that are observable by the operator or user of the system, then a reduction in resolution causes eyestrain, fatigue, and even vertigo.

It would be desirable to provide a microscope optical projection viewing system which has optical resolving power as good as the ability of the human eye resolving power and free from observable color separation and aberrations. It would also be desirable to provide the optical projection viewing system with a long field distance for reducing eye strain.

SUMMARY OF THE INVENTION

It is a principal object of the present invention to provide in an optical projection viewing system a single element non-symmetric biconvex biocular viewing lens having a flat field close to one diopter to prevent eye focus strain.

It is another principal object of the present invention to provide in an optical projection viewing system a novel non-symmetric biconvex biocular viewing lens having noticeable negative distortion which compensates for the positive distortion.

It is yet another principal object of the present invention to provide in an optical projection viewing system a novel non-symmetric biconvex viewing lens having noticeable positive color separation and a novel relay projection lens having noticeable negative color separation which compensates for the positive color separation.

It is a general object of the present invention to provide a small and compact optical viewing system having a high vision index or figure of merit.

It is another general object of the present invention to provide in a compact optical viewing system a relay projection lens having wide projection and a wide field.

It is another general object of the present invention to provide in an optical projection viewing system a new and improved relay projection lens having a wide angle of projection which just fills a screen at a close distance.

It is another general object of the present invention to provide in an optical projection viewing system an optimized relationship between the biocular viewing lens and the viewing screen and between the viewing screen and the relay projection lens so as to minimize distortion and aberrations and to maximize magnification and light efficiency.

DESCRIPTION OF TERMS

Figure 1:
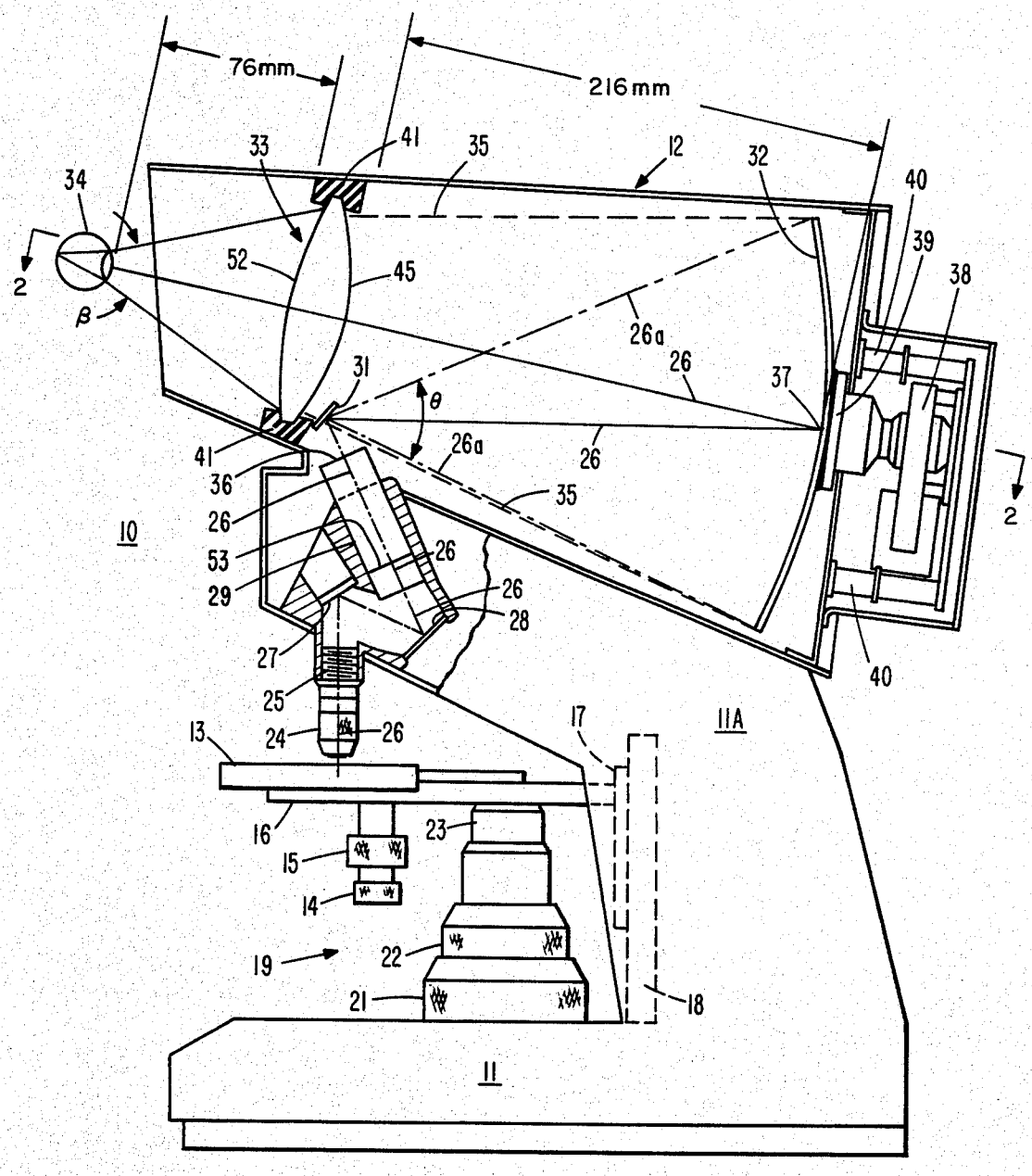
FIG. 1 is a right side elevation in partial section showing a preferred embodiment optical projection viewing system mounted on a base which supports an adjustable work station.

Before referring to the drawings, words employed in this specification shall have their common technical meaning as well as the meaning given to the following terms.

The term system magnification as employed in this specification shall refer to the ratio of image size seen by the viewer to the size of the image on the reticle plane of the relay projection lens.

The term 1× or one power magnification is achieved when an object is viewed by the human eye at a distance of ten inches, thus, when the object is viewed at a distance of less than ten inches it is magnified by the human eye.

Magnification is the simple ratio of image size to object size whereas magnifying power of a system is the ratio of image angular subtense due to the optical system to object angular subtense at the standard viewing distance of ten inches.

The term field distance as employed in this specification is the distance at which the eye focuses to view an object or an image. An object at an infinite distance will have a field distance of infinity and the lens of the eye is in focus without any muscular adjustment.

The term field distance accommodation as employed in this specification refers to the ease at which the two eyes of a viewer will adjust to small variations in field distance between the two eyes.

Eye accommodation and eye comfort relate to the field distance at which the eyes of the viewer will adjust over long periods without eye strain.

Pincushioning or positive distortion occurs when the magnification at the edges of a lens is greater than at the center of the lens.

Barrelling or negative distortion occurs when the magnification at the center of the lens is greater than at the edges of the lens.

DESCRIPTION OF THE PREFERRED EMBODIMENT

Refer now to figure one showing the Preferred Embodiment Optical Projection Viewing System 10. The base of the Viewing system 10 comprises a lower base 11 and an upper support base 11A which supports the viewing housing 12. The viewing housing 12 is preferably rectangular in cross-section and mounts on the extension of the upper arms 11A of base 11. An object or specimen to be viewed is placed on work station 13 which adjusts in the X and Y directions by means of an X motion control wheel 14 and a Y motion wheel 15 which is co-actually mounted with the control wheel 14. Such X and Y adjustable work stations are known and do not require a detailed description herein.

The X-Y motion work station is mounted on a Z motion platen 16 which is fixed to a vertical slider 17. Vertical slider 17 is movably mounted in a pair of vertical guides 18 attached to the sides of the frame 11A. Z adjustment means 19 comprised a coarse adjustment wheel 21 and a co-axially mounted fine adjustment wheel 22. The Z adjustment means 19 are fixed to the base 11 and are provided with an upper extendable portion 23 fixed to the patent 16.

An object or specimen is placed on the work station 13 opposite the objective lens 24 which is screw mounted into the optical fold block 25. Optical fold block 25 is mounted on an interior surface of the upper arms 11A of the base 11. Details of such optical fold blocks are described in my aforementioned U.S. Pat. No. 4,449,799. The optical path 26 starts at the work station 13 and reflects off of a first surface mirror 27 where it is folded and projected onto the front surface of a second first surface mirror 28 and projects a real image onto the relay projection lens 29 where the real image is formed at the reticle plane of the relay projection lens 29. The real image at the reticle plane of relay projection lens 29 is converged along optical path 26 and then reflected as a small circle or spot off the first surface projection mirror 31 as a diverging cone of light rays having a cone angle theta $\theta$. The aforementioned real image is thus folded and projected at a cone angle which is designed to exactly subtend and fill the complete circular screen 32. Circular screen 32 is shown having a concave shape formed with a constant radius. The spherical shape is purposely designed to enable the system to provide a flatter field and direct a majority of the light rays back through the biocular viewing lens 33 as will be explained hereinafter. The rotating circular spherical screen 32 is provided with a spectral coating on the front surface which directs the light rays 26A from the front surface projection mirror 31 back toward the optical projection viewing lens 33 in a cone 35 which subtends the viewing lens 33 with minimum diffusion and reflection onto the sides of the housing 12. The light being reflected off of the circular screen 32 is shown as being reflected within the cone lines 35 which substantially fills the biocular viewing lens 33. The light leaving circular screen 32 passes through the biocular viewing lens 33 and is projected toward the eye of the observer in substantially parallel rays. Thus, the distance of the eyes from the biocular viewing lens 33 does not noticeably change the magnification of the image on screen 32. For purposes of explanation of the terms used in this application the eye 34 of the observer is capable of viewing the full field of the biocular viewing lens 33 as shown by the image subtense angle beta. In the preferred embodiment the lens of the eye 34 is the first surface of the optical lens system. The distance from the lens of the eye 34 to the front or second surface 52 of the biocular viewing lens 33 is preferably approximately 76 millimeters. The biocular viewing lens 33 is shown as having non-symmetric spherical surfaces (having constant radius) for purposes which will be discussed in detail hereinafter. The distance from the rear or third surface 45 of the biocular lens 33 to the center of the rotating circular screen 32 is shown as approximately 216 millimeters and provides an increase in magnification. The distance from the front surface 36 of the relay projection lens 29 along the optical path 26 to the point 37 on the center of the rotating screen 32 is approximately 216 mm and is designed so that the wide projection angle of the relay projection lens just fills the 181 mm diameter of the reflective surface of the rotating screen 32.

Electric motor 38 is resiliently mounted on viewing housing 12 with resilient mounts 40 and is provided with a rotating flange 39 which is adhesively bonded to the rear surface of rotating screen 32. Resilient mounting means 41 are shown supporting the biocular lens 33 in the housing 12.

Figure 2:
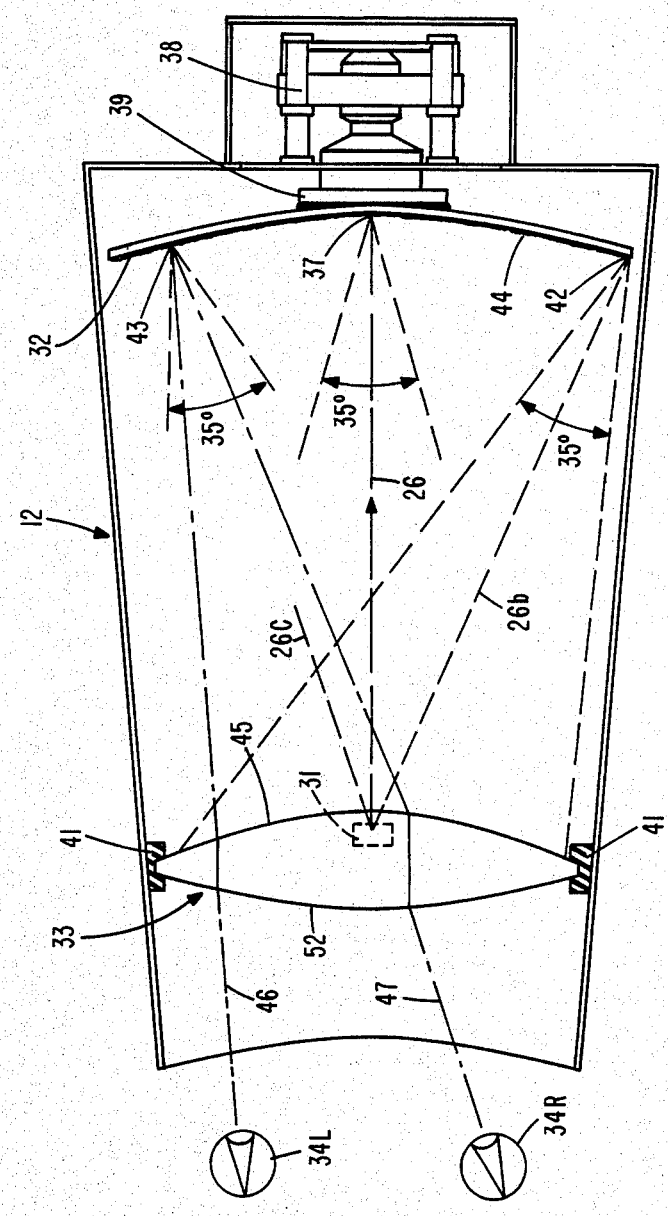
FIG. 2 is an enlarged section in plan view taken at lines 2—2 of FIG. 1.

Refer now to FIG. 2 which is an enlarged section in plan view taken at the center of the housing 12 as shown by lines 2—2 of FIG. 1. The image projected on screen 32 is reflected from front surface projection mirror 31 along optical path 26 and is reflected from the center of circular screen 32 from point 37. The light being reflected from the spectral surface 44 on the front of screen 32 forms a cone angle of 35 degrees as shown diverging from point 37. The spectral reflective raised surface 44 on the front surface screen 32 can be specified to provide this reflection angle. The curvature of screen 32 aims the spectral surface 44 at an angle which causes the light path 26 to be reflected from different points on the front surface of the screen 32 to exactly encompass the entire rear surface 45 of the biocular viewing lens 33. For example an optical path 26b emanating from the projection mirror 31 strikes the front surface of screen 32 at point 42 and reflects a cone of light having a cone angle of 35 degrees which also subtents or encompasses the rear surface 45 of biocular viewing lens 33. Similarly a beam of light from the projection mirror 31 which proceeds along optical path 26c strikes the front surface of the screen 32 at point 33 and reflects back toward the biocular viewing lens 33 with an angle of 35 degrees which encompasses the rear surface 45 of the biocular viewing lens 33. Every point on the 181 mm field of view front surface of screen 32 projects its light from the image back toward the biocular viewing lens 33 so as to avoid projecting light onto the sidewalls of housing 12. It has been found that the spectral reflective material 44 on the front surface of screen 32 can achieve efficiencies greater than 85%.

The light path distance 46 from the lens of left eye 34L to point 43 is substantially a straight line. The light path distance 47 from the right eye 34R to the same point 43 on screen 32 passes through the lens 33 at a greater viewing angle which creates problems when the two eyes of an observer attempt to focus on any point on the screen. When the two eyes 34L and 34R attempt to view different points on screen 32 the angular light path 46 and 47 which pass through the biocular viewing lens 33 are different which creates variation in field distance for both eyes 34L and 34R. When the two eyes of an observer attempt to focus on an object which appears to the two eyes to be at different field distances the lenses of the two eyes attempt to focus for the different field distances which has been found to cause eye strain, and often a sensation of vertigo to the person viewing the image.

Figure 3A:
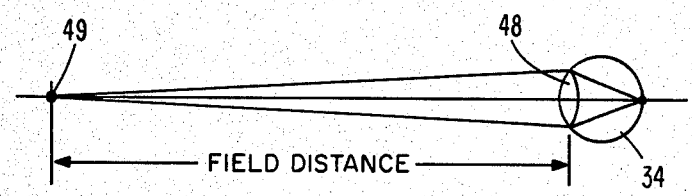
FIGS. 3A and 3B are schematic drawings showing the field distance of the human eye alone and the field distance of the human eye with a lens interposed between the object and the viewer.
Figure 3B:
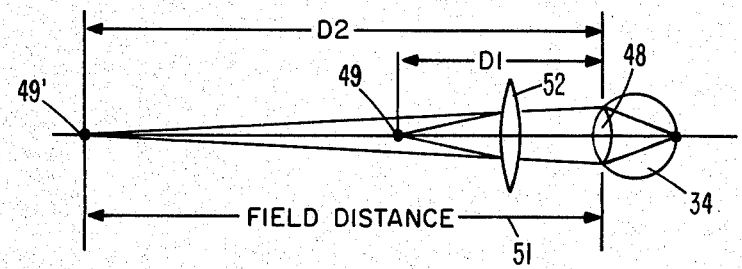

Refer now to FIGS. 3A and 3B showing a schematic drawing of the field distance observed by the human eye with and without a lens interposed between the eye and the object being viewed. FIG. 3A shows the lens 48 of a human eye 34 focused on a point object 49. When the lens of the eye 48 is properly focused onto point object 49 the field distance for the lens 48 is the actual distance from the lens of the eye to the point object 49. If the point object 49 is removed to a distance of infinity there is substantially no muscular strain on the lens 48 of the eye. This is the most desirable for a person having to view an object over a long period of time. If the point object 49 is so remote from the eye 34, the details of the object are indistinguishable. However, on the other hand the object 49 may be brought so close to the eye that not even the greatest strain or accomodation of the eye muscle can produce a sharp image of the object and focus it on the retina of the eye 34. As explained hereinbefore when the eye object 49 is approximately 10 inches from the eye 34, the magnifying power of the lens 48 is 1× or 1 power magnification. When the human eye is not capable of achieving the necessary magnifying power by bringing the object closer to the eye the only recourse is to aid the eye by use of a suitable optical instrument whereby the object is magnified to such an extent that the parts of it which were obscure or entirely indistinguishable to the naked eye will be revealed.

Refer now to FIG. 3B showing the human eye 34 having a lens 48. Interposed between the object 49' there is shown a magnifying viewing lens 52. The object 49 placed at a remote distance 52 may now be brought closer to the eye 34 to a point where the object 49 is at a distance D1. The rays of light leaving the object 49 are not bent and redirected by magnifying lens 52 so that the cone of light entering the lens of the human eye 34 in FIG. 3B is substantially equal to the cone of the light from the object 49 in FIG. 3A. Thus, the accommodation of muscular strain on the lens 48 of the human eye 34 is the same in both FIGS. 3A and 3B and the eye 34 in both instances is accommodating for a field distance shown as distance D2. Since the point object 49 being viewed through the magnifying lens 52 is closer to the eye 34 the point object 49 appears to the eye to be magnified. The magnification power of the magnifying viewing lens 52 is defined by the ratio of the distance D2 to D1. Similarly, magnifying power may be defined as the ratio of the apparent size of the image as seen employing the magnifying viewing lens 52 to the apparent size of the object as it would appear at the field distance D2 without the magnifying lens 52.

Refer now to FIGS. 2 and 3. Each of the points 37, 42 and 43 shown on the surface of viewing screen 32 may be considered a point object similar to object 49. Thus, the angle of the light from the point source 42 is bent and converged as it passes through the biocular viewing lens 33 so that the angle of divergence is established to the eyes 34L and 34R regardless of how far from the biocular viewing lens 33 the observer may be. The new divergence angle has been established by the novel design of the biocular viewing lens 33, and it has been preferably established to be one diopter. Thus, one diopter is the field distance and the eye accommodation for the lens of the human eye 48 accommodates for a field distance of one meter and this field distance has been found to be a very comfortable field distance which does not cause fatigue and eye strain. The radius of curvature of the second or front surface 52 of the biocular viewing lens 33 is greater than the radius of curvature of the third or rear surface 45. These radii are selected to control variations in eye accommodation and to keep them to the absolute minimum. The field distance is held to 1/20 of 1 diopter maximum across the tangential field which is substantially flat. The biocular viewing lens 33 is designed so that all points within the field of view can be viewed by both eyes without causing moe than plus or minus ⅛ of one diopter shift in eye accommodation. Further, the maximum difference in eye accommodation between the two eyes viewing the same image on the viewing screen 32 is held to plus or minus 1/10 of one diopter. In order to control the possibility of vertigo due to the shift in eye accommodation with the change of the position of the eyes relative to the biocular viewing lens 33 the eye accommodation due to eye shift is held to 1/600 of one diopter per mm change of eye location relative to the front surface 52 of the biocular viewing lens 33.

The novel biocular viewing lens 33 has been designed for a magnification power of approximately 1. Due to the critical design requirements of magnification and field distance, the novel biocular viewing lens 33 incurred approximately three to five percent positive distortion or pincushioning as a maximum at the edges. As will be explained hereinafter the novel projection relay lens 29 has been designed to provide a negative or barrelling distortion of approximately two percent so that the overall distortion as seen by the operator or viewer is reduced to one to two percent which is not noticeable under most conditions. Further, the aforementioned design requirements imposed on the novel biocular viewing lens 33 produces positive color separation which may be defined by a color blur circle of approximately 0.9 mm. To compensate for this positive color separation the aforementioned novel projection relay lens 29 has been provided with a negative color separation correction which reduces the color blur circle observed by the viewer to approximately 0.4 mm. This amount of color separation is not noticeable to the human eye under most conditions and does not impair the line resolution. By providing a large rectangular biocular viewing lens 33 the normal operator is able to find a portion of the center of the lens which provides eye comfort and eye accommodation. The ability to move his eyes over a large area of the biocular viewing lens without incurring color separation or aberrations reduces the amount of operator fatigue incurred over long periods of use. The preferred embodiment biocular viwing lens is at least three inches high by five inches wide to accommodate comfortable head movement. The lens thickness on axis is approximately 20 millimeters which substantially enhances the ability to avoid color separation and aberrations.

Since the radii of curvature of the biocular viewing lens is designed non-symmetric, the capability of the lens for image resolution has been held to at least 5 line pairs per mm across the 181 mm diameter screen. This degree of image resolution of at least 5 line pairs per mm across the field of the screen is at least equal to the ability of the human eye to resolve line pairs.

Figure 4:
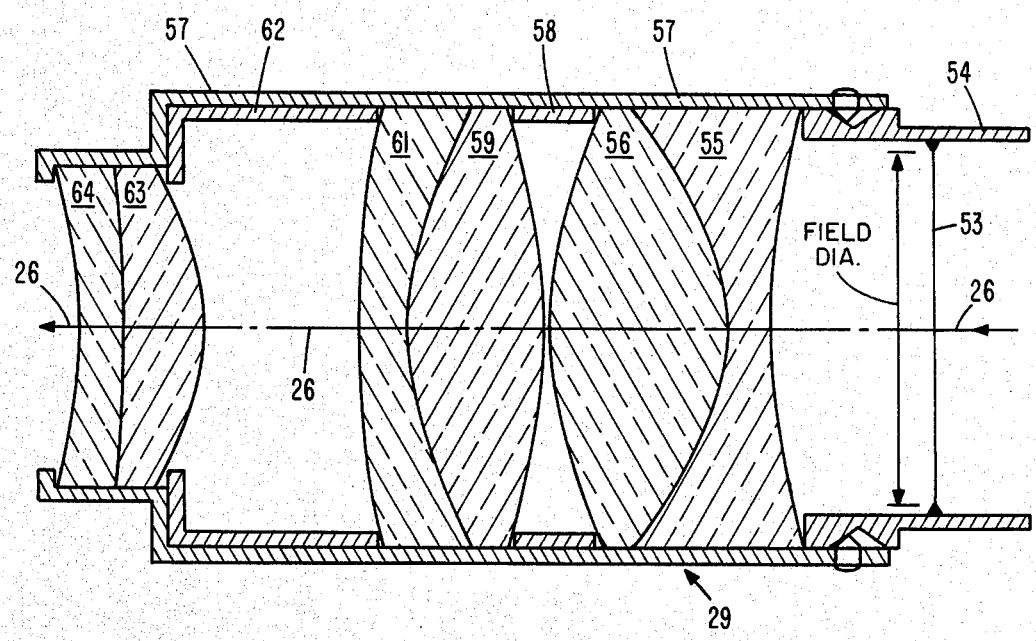
FIG. 4 is an enlarged section in elevation taken through the novel relay projection lens.

Refer now to FIG. 4 showing an enlarged detailed section through the novel relay projection lens 29. As previously described with reference to FIG. 1 the objective lens 24 is an interchangeable magnifying lens of the type employed in compound microscopes. The magnification power of this lens is not included in the magnification power of the optical viewing system 10. Thus, the total magnification of the object seen by the observer is the product of the objective lens 24 and the magnification power of the optical projection viewing system 10.

For all practical purposes the optical projection viewing system 10 is analogous to the eyepiece of a compound microscope, and as explained herein before has substantially the same resolving power and absence of aberrations as standard quality microscope eye pieces. The image projected by the objective lens 24 is formed at the reticle plane 52 and is relayed or projected through the lens elements of lens system 29. In the preferred embodiment of the present invention the lower tube 54 of the lens 29 is provided with a field diameter of field size describing the maximum size of the image which can be relayed through the lens as being 22 mm in diameter. The first cemented pair of lenses 55 and 56 comprises an acromat meniscus lens mounted in tube 57 between the lower tube 54 and spacer 58. The outer surfaces of the cemented pair provide a larger radius of curvature at the concave surface than at the convex surface. The second cemented pair 59, 61 comprises a biconvex acromat having non-symmetric outer surfaces. The second cemented pair 59, 61 is held in tube 57 by spacer 58 and spacer 62. The third and last cemented pair 63, 64 comprises an acromat meniscus lens pair having different air to glass radii of curvature. It has been found that providing three separate and distinct color corrected cemented pairs within the novel relay projection lens provides the designed flexibility to permit the maximum negative compensating color separation and negative distortion. The novel relay projection lens 29 also provides optimum magnification while providing a wide projection angle having a larger field diameter than was heretofore possible in the prior art. Further, the novel relay projection lens may be and has been designed to maintain 50 line pairs of resolution per mm at the reticle plane and project this degree of line pair resolution onto the viewing screen 32 while maintaining high contrast of at least fifty percent between line pairs. By the time this magnified and enlarged projected image is viewed by the observer on the viewing screen 32, the line pairs have been enlarged by a factor of approximately 10 that is now widened to a line resolution of 5 pairs per mm which is the limit of the capability of the human eye to observe.

The viewing screen is 181 mm in diameter and the field size is 20-22 mm in diameter, thus, the magnifying power of lens 29 is approximately 9.1. To achieve a magnifying power of 10, the focal length of lens magnifying power is approximately 1.1.

Having explained a preferred embodiment novel biocular viewing lens 33 and a preferred embodiment relay projection lens 29, it will be understood that minor modifications may be made to either of the two novel lenses and still maintain offsetting color separation and distortion. The novel relay projection lens 29 provides compensating for the minor degree of positive color separation and distortion generated by the novel biocular viewing lens 33 which has optimum magnification, flat field, one diopter field distance for ease of viewing and eye shift accommodation. The thin on axis non-symmetric biconvex lens 33 also maintains five line pairs per mm resolution for viewing the image projected on the viewing screen 32.

The novel lenses combine to provide a magnification of approximately 10, and when multiplied by the field diameter of twenty to twenty millimeters produces an index of merit of vision index of up to 220 which far exceed prior art optical projection systems which had noticeable color separation and aberration.

I claim:

1. An optical projection viewing system comprising:
   a viewing housing,
   an objective lens juxtaposed an object to be viewed,
   a relay projection lens in said viewing housing for projecting a wide field image from said object from said objective lens,
   a viewing screen in said viewing housing having a full field image projected thereon,
   a non-symmetric biocular viewing lens in said viewing housing intermediate said imaging screen and a person viewing said full image on said imaging screen,
   said biocular viewing lens having non-symmetric front and rear biconvex surfaces,
   said biconvex surfaces having different radius of curvature, whereby the light path distance from a point on said viewing screen to the eyes of the person viewing said screen is different and the field distance correction provided by said non-symmetric biconvex biocular viewing lens provides a uniform field distance to both eyes within one eighth of one diopter over said field of image.

2. An optical projection viewing system as set forth in claim 1 wherein the field distance accommodation between the two eyes of said person viewing said image over said viewing screen is approximately plus or minus one tenth of one diopter.

3. An optical projection viewing system as set forth in claim 1 wherein the field distance accommodation between the two eyes of said person viewing said image over said viewing screen is greater than one-five hundredth of one diopter change per millimeter of eye location change over said viewing screen.

4. An optical projection viewing system as set forth in claim 1 wherein the field distance accommodation between the two eyes of said person viewing said image over said viewing screen is greater than one-four hundredth of one diopter change per millimeter of eye location change over said viewing screen.

5. An optical projection viewing system as set forth in claim 1 wherein said flat field image is flat within one-twentieth of one diopter.

6. An optical projection viewing system as set forth in claim 1 wherein said viewing screen is curved to provide flattening of the field image.

7. An optical projection viewing system as set forth in claim one wherein said biocular viewing lens is a single element.

8. An optical projection viewing system comprising:
   a viewing housing,
   an objective lens juxtaposed an object to be viewed,
   a viewing screen in said viewing housing,
   an image magnifying relay projection lens in said housing for projecting an image from said objective lens onto said viewing screen, said relay projection lens having greater projecting magnification at the center than towards the edges resulting in negative distortion or barrelling of the projected image,
   a magnifying biocular viewing lens intermediate said viewing screen and a person viewing said screen,
   said biocular viewing lens having increasing magnification towards the edges as opposed to the center of the lens thereby introducing noticeable positive distortion, whereby, the combination of negative and positive distortion compensate for each other to provide an image which appears substantially non-distorted with linear magnification.

9. An optical projection viewing system as in claim 8 wherein the amount of pincushioning distortion of said biocular viewing lens is approximately three to five percent measured at the screen and said image magnifying relay projection lens having an opposite sign of distortion of between one to two percent resulting in a net distortion of the image to the viewer of not more than three and one-half percent.

10. An optical viewing system as set forth in claim 8 wherein said biocular viewing lens has positive color separation and said relay lens has color separation of the opposite sign to reduce the color blur circle to 0.4 mm.

11. An optical projection viewing system comprising:
    a viewing housing,
    an objective lens juxtaposed an object to be viewed,
    a relay projection lens having a wide angle for projecting a wide field image of said object from said objective lens,
    a viewing screen in said viewing housing having a full image projected thereon from said relay projection lens,
    a biocular viewing lens in said viewing housing, intermediate said viewing screen and a person viewing said full image on said viewing screen from a distance of approximately three inches from said viewing screen,
    said viewing screen being less than ten inches from said biocular viewing lens adjusts said image to a field distance of approximately one diopter to said person viewing said full image,
    said field distance of said biocular lens measured as the distance from the eye of the person viewing said full image to a point from which the image appears being approximately one meter to reduce eye muscle strain.

12. An optical projection viewing system as set forth in claim 11 wherein said relay projection lens has a wide projection angle for projecting a 181 mm. full image on said imaging screen at a distance of not more than 231 mm. to just fill said imaging screen.

13. An optical viewing system as set forth in claim 12 wherein said biocular viewing lens is greater than 5.0 inches wide and 3.0 inches high and has a focal distance which is greater than the distance to said screen to produce a magnification of said image on said screen of not less than 1× magnification.

14. An optical viewing system as set forth in claim 13 wherein said biocular viewing lens has greater than 4.5 line pair per mm image resolution across a field of view of at least 175 mm.

15. An optical viewing system as set forth in claim 14 wherein said biocular viewing lens has a field distance of greater than one-half dioptor.

16. An optical projection viewing system comprising:
a viewing housing,
an objective lens juxtaposed an object to be viewed,
a relay projection lens in said viewing housing for projecting an image from said objective lens, said relay lens having a reticle image plane size greater than eighteen millimeters in diameter, and a full field projected image magnified greater than eight times,
an imaging screen in said housing having the full image from said relay projection lens formed thereon,
a biocular viewing lens having a magnifying power of approximately one in said housing intermediate said imaging screen and a person viewing said screen to provide a magnified image greater than eight times,
said optical viewing system having a vision index between 150 and 200 where said vision index is defined as the product of the said field size in millimeters of said projection lens and the magnification of the object as seen as an aerial image by the person viewing the said imaging screen through said biocular viewing lens.

17. An optical viewing system as set forth in claim 16 wherein said biocular viewing lens is greater than 5.5 inches wide and 3.5 inches high and is mounted at a distance from said viewing screen to produce a magnification of said image on said screen of not less than 1× magnification.

18. An optical viewing system as set forth in claim 17 wherein said biocular viewing lens has greater than 4.5 line pair per mm image resolution across a field of view of not less than 175 mm.

19. An optical viewing system as set forth in claim 18 wherein said biocular viewing lens has a field distance of greater than one-half diopter.

* * * * *